United States Patent
Kellams (10) Patent No.: US 11,395,974 B1
(45) Date of Patent: Jul. 26, 2022

(54) CONTEXTUALLY AWARE ACTIVE SOCIAL MATCHMAKING

(71) Applicant: Electronic Arts Inc., Redwood City, CA (US)

(72) Inventor: Jean Pierre Kellams, Orlando, FL (US)

(73) Assignee: Electronic Arts Inc., Redwood City, CA (US)

(*) Notice: Subject to any disclaimer, the term of this patent is extended or adjusted under 35 U.S.C. 154(b) by 88 days.

(21) Appl. No.: 16/865,856

(22) Filed: May 4, 2020

(51) Int. Cl.
*A63F 13/73* (2014.01)
*A63F 13/798* (2014.01)
*A63F 13/795* (2014.01)
*A63F 13/812* (2014.01)

(52) U.S. Cl.
CPC .......... *A63F 13/798* (2014.09); *A63F 13/795* (2014.09); *A63F 13/812* (2014.09); *A63F 2300/558* (2013.01); *A63F 2300/5566* (2013.01)

(58) Field of Classification Search
CPC .... A63F 13/798; A63F 13/812; A63F 13/795; A63F 2300/558; A63F 2300/5566
USPC .......................................................... 463/42
See application file for complete search history.

(56) References Cited

U.S. PATENT DOCUMENTS

| | | | |
|---|---|---|---|
| 8,425,330 B1 | 4/2013 | Kislyi et al. | |
| 10,286,327 B2* | 5/2019 | Xue | A63F 13/67 |
| 10,353,720 B1* | 7/2019 | Wich-Vila | G06Q 10/06395 |
| 10,905,962 B2* | 2/2021 | Kaethler | A63F 13/75 |
| 11,260,305 B2* | 3/2022 | Reeves | A63F 13/798 |
| 2006/0089840 A1* | 4/2006 | May | G16H 20/30 715/224 |
| 2009/0149246 A1* | 6/2009 | Opaluch | A63F 13/63 463/29 |
| 2011/0161076 A1* | 6/2011 | Davis | H04M 1/72448 704/E15.001 |
| 2012/0077599 A1* | 3/2012 | Van Luchene | A63F 13/75 463/42 |
| 2015/0347954 A1* | 12/2015 | Stern | G06Q 10/063112 705/7.14 |
| 2016/0001181 A1* | 1/2016 | Marr | G07F 17/3227 463/42 |
| 2017/0259178 A1* | 9/2017 | Aghdaie | A63F 13/73 |
| 2018/0308056 A1* | 10/2018 | Hartmann | G06Q 10/1053 |
| 2018/0341903 A1* | 11/2018 | Keen | G06Q 10/063118 |
| 2019/0188967 A1* | 6/2019 | Giuffria | G07F 17/3267 |

(Continued)

OTHER PUBLICATIONS

Stratego, Instructions, Milton Bradley Company, copyright 1996 (Year: 1996).*

*Primary Examiner* — Michael A Cuff
(74) *Attorney, Agent, or Firm* — McDermott Will & Emery LLC (57) ABSTRACT

Various aspects of the subject technology relate to systems, methods, and machine-readable media for contextual matchmaking. The method includes receiving player information for a plurality of players, the player information for each player comprising at least one of player statistics, player tendencies, and player preferences. The method also includes generating player archetypes for each of the plurality of players based on the player information, each of the player archetypes comprising at least one premier scenario. The method also includes matching the players based on the player archetypes. The method also includes generating in-game objectives based on the player archetypes.

20 Claims, 4 Drawing Sheets

(56) References Cited

U.S. PATENT DOCUMENTS

2020/0036761 A1\* 1/2020 Weinwurm ......... H04L 65/4015
2020/0306645 A1\* 10/2020 Patel ..................... A63F 13/795

\* cited by examiner

| | Offensive-Minded Player | Defensive-Minded Player |
|---|---|---|
| Objective 1 | Gain 400 yards of total offense | Hold player A to less than 200 yards of offense |
| Objective 2 | Throw for 4 touchdowns | Sack the QB 5 times |
| Objective 3 | Beat the point spread: -14 | Beat the point spread: +14 |

000# CONTEXTUALLY AWARE ACTIVE SOCIAL MATCHMAKING

TECHNICAL FIELD

The present disclosure generally relates to video games, and more particularly to contextually aware active social matchmaking.

BACKGROUND

Video games, such as sports video games, first person shooter games, or other online games, often include a multiplayer mode allowing multiple players to connect online to interact with one another in the video game. Players may select a game mode they would like to play, and the video game may find other players looking to play the same game mode. The game will attempt to match players accordingly. However, various criteria may be utilized to match players depending on what each player desires to experience.

BRIEF SUMMARY

The subject disclosure provides for systems and methods for contextually aware active social matchmaking. In an aspect, contextually aware, active social matchmaking leverages player information to typify player affinities and tendencies, then matches them with other players who have complimentary traits for a fun experience, based on administrator rules tuned by machine learning models. It reinforces player enjoyment experience with dynamically generated per-game objectives driven by these matchmaking traits. Finally, it evaluates the player enjoyment of the match and uses these results to tune both matchmaking and in-game objectives generation.

According to one embodiment of the present disclosure, a computer-implemented method for contextual matchmaking is provided. The method includes receiving player information for a plurality of players, the player information for each player comprising at least one of player statistics, player tendencies, and player preferences. The method also includes generating player archetypes for each of the plurality of players based on the player information, each of the player archetypes comprising at least one premier scenario. The method also includes matching the players based on the player archetypes. The method also includes generating in-game objectives based on the player archetypes.

According to one embodiment of the present disclosure, a system is provided including a processor and a memory comprising instructions stored thereon, which when executed by the processor, causes the processor to perform a method for contextual matchmaking. The method includes receiving player information for a plurality of players, the player information for each player comprising at least one of player statistics, player tendencies, and player preferences. The method also includes generating player archetypes for each of the plurality of players based on the player information, each of the player archetypes comprising at least one premier scenario. The method also includes matching the players based on the player archetypes. The method also includes generating in-game objectives based on the player archetypes.

According to one embodiment of the present disclosure, a non-transitory computer-readable storage medium is provided including instructions (e.g., stored sequences of instructions) that, when executed by a processor, cause the processor to perform a method for contextual matchmaking. The method includes receiving player information for a plurality of players, the player information for each player comprising at least one of player statistics, player tendencies, and player preferences. The method also includes generating player archetypes for each of the plurality of players based on the player information, each of the player archetypes comprising at least one premier scenario. The method also includes matching the players based on the player archetypes. The method also includes generating in-game objectives based on the player archetypes.

According to one embodiment of the present disclosure, a system is provided that includes means for storing instructions, and means for executing the stored instructions that, when executed by the means, cause the means to perform a method for contextual matchmaking. The method includes receiving player information for a plurality of players, the player information for each player comprising at least one of player statistics, player tendencies, and player preferences. The method also includes generating player archetypes for each of the plurality of players based on the player information, each of the player archetypes comprising at least one premier scenario. The method also includes matching the players based on the player archetypes. The method also includes generating in-game objectives based on the player archetypes.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

Video games, such as sports video games, first person shooter games, or other online games, often include a multiplayer mode allowing multiple players to connect online to interact with one another in the video game. Players may select a game mode they would like to play, and the video game may find other players looking to play the same game mode. The game will attempt to match players accordingly. However, various criteria may be utilized to match players depending on what each player desires to experience. For example, some players may prioritize having fun rather than competition.

Conventional methods of player matchmaking includes skill-based matchmaking where players are matched solely on a skill level of each player. As a result, higher ranked players are matched with each other, and lower ranked players are matched with each other as well. Although this is beneficial for maximizing competition among players, the desire to play a competitive match may not be shared among all players. Some players may desire having an enjoyable social gaming experience that is not necessarily competitive. If the players are not having an enjoyable experience, then the players may drop out of matches, and eventually may quit playing the game altogether.

Aspects of the present disclosure address these issues by providing for systems and methods for contextual matchmaking. In an aspect, contextually aware, active social matchmaking leverages player information to typify player affinities and tendencies, then matches them with other players who have complimentary traits for a fun experience, based on administrator rules tuned by machine learning models. It reinforces player enjoyment experience with dynamically generated per-game objectives driven by these matchmaking traits. Finally, it evaluates the player enjoyment of the match and uses these results to tune both matchmaking and in-game objectives generation.

The disclosed system addresses a problem in traditional video game player matchmaking tied to computer technology, namely, the technical problem of matching players based on their desired gaming experience. The disclosed system solves this technical problem by providing a solution also rooted in computer technology, namely, by providing for contextually aware active social matchmaking.

Figure 1:
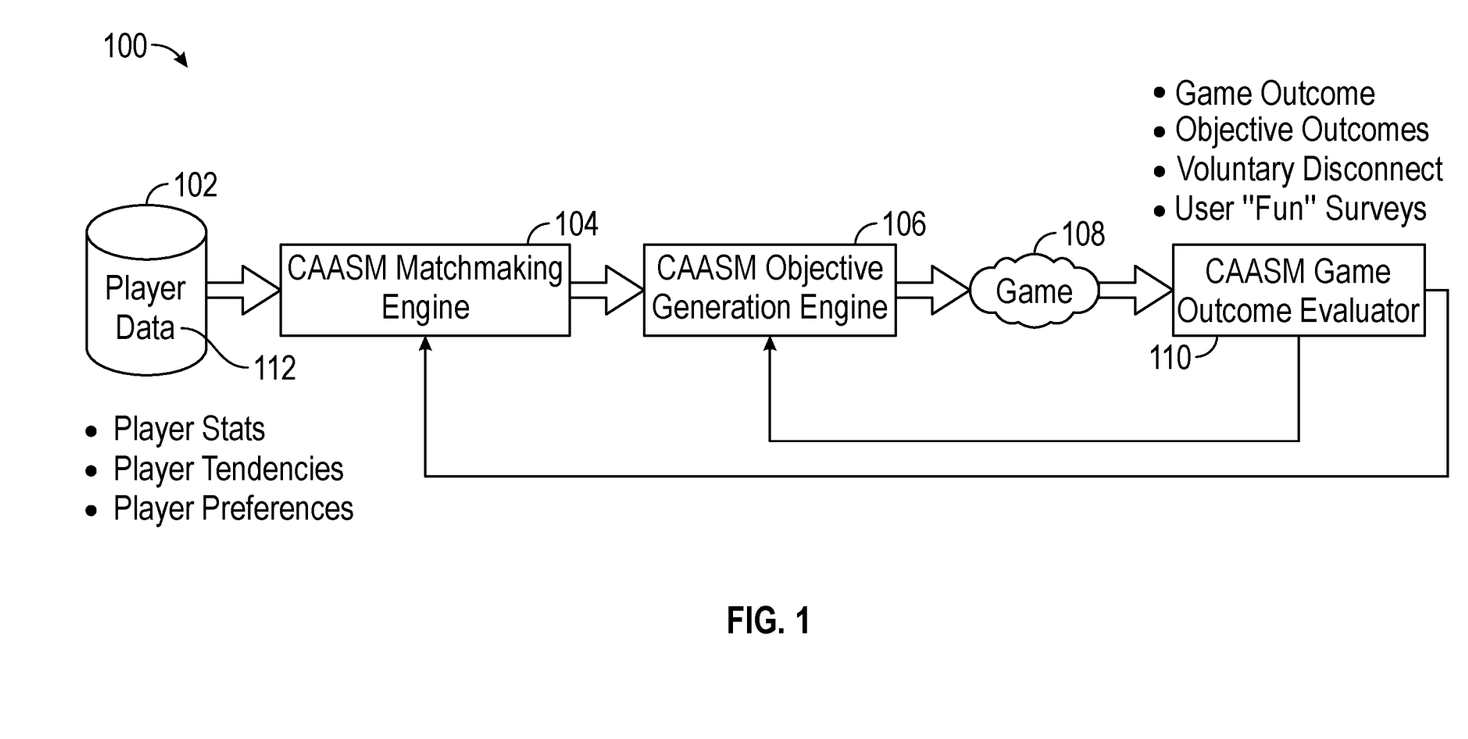
FIG. 1 illustrates an exemplary system for contextual matchmaking, according to certain aspects of the present disclosure.

FIG. 1 illustrates an exemplary system 100 for contextual matchmaking, according to certain aspects of the present disclosure. The system may include a database 102, a matchmaking engine 104, an objective generation engine 106, a video game 108, and an outcome evaluator 110.

The database 102 may include player information 112 such as player statistics, player tendencies, and player preferences. Player statistics may include information regarding player performance in a game. For example, in a sports game, such as football, the player statistics may include how many touchdowns were thrown, total yardage gained, win-loss record, points allowed, etc. In an implementation, the player statistics may include a gamer score (e.g., a Glicko rating) that measures a player's adeptness at the game.

According to an aspect, player tendencies may include information regarding a player's inclination towards certain game features. For example, in a sports game, the player tendencies may include favorite game mode, favorite team, favorite type of player, etc. According to aspects, player tendencies may be derived from player statistics.

According to an aspect, player preferences may include explicit video game preferences selected by the player. In an implementation, the player information 112 may include information for all games each player has played. As a result, each player may be matched accordingly with other players based on performance for specific games.

According to an aspect, the matchmaking engine 104 may receive (e.g., query) the player information 112 from the database 102 to generate player archetypes. For example, the matchmaking engine 104 may take player statistics, tendencies, and preferences (e.g., yards run, completion percentage, wins, favorite teams, etc.) to generate multiple weighted player archetypes. For example, for a football game, player archetypes may include offensive-minded, great quarterback (QB), poor-at-defense, etc. As will be described in more detail below, the player archetypes may be used to generate scenarios that would be enjoyable for each player. Based on a combination of the player archetypes and scenarios, a matching algorithm may be utilized to calculate a matchmaker score. For example, the players may be matched by the matchmaking engine 104 based on the matchmaker score.

In an implementation, the player archetypes may be initially generated based on administrator rules. For example, a player having player information 112 that shows strength in offense may be associated with a player archetype for being offensive-minded.

Once the matchmaking engine 104 has created a match between players, the corresponding player archetypes for each player may be utilized by the objective generation engine 106 to generate in-game objectives for each match. For example, the matchmaking engine 104 may determine that an ideal match for an offensive minded player would be a defensive minded player. Once the offensive minded player is matched with a defensive minded player, the objective generation engine 106 may generate in-game objectives for each player. As will be described in more detail below, the in-game objectives may be generated based on each player's strengths. For example, the offensive minded player may have in-game objectives that are offense based (e.g., total yards gained, touchdowns scored, beating a point spread, etc.), and the defensive minded player may have in-game objectives that are defense based (e.g., limiting total yards, QB sacks, beating a point spread, etc.).

The game 108 may then be played based on the created match between the players, which includes the in-game objectives for each player. Upon completion of the game 108, an outcome of the game 108 may be evaluated by the outcome evaluator 110. For example, the outcome evaluator 110 may evaluate whether each player enjoyed the match. The outcome evaluator 110 may consider several factors, including, but not limited to, whether the match was close (e.g., based on a game completion score, final score, etc.), whether the in-game objectives were completed, whether a player voluntarily left the match prior to its completion, and/or a survey (e.g., player may be asked whether they had fun/enjoyed the game 108). For example, whether a player over-achieved or under-achieved on the in-game objectives may be an indicator that the in-game objectives themselves were driving an undesirable or desirable result. Additionally, if a player left the match prior to completion, a state of the match, including matchmaking parameters (e.g., player archetypes) and in-game objectives may be noted in order to make a better match next time. Finally, a player's response to a survey may provide direct evidence of whether the match was a success. It may also be determined whether similar matches elicited similar results, and whether or not it would be desirable to repeat those matchmaking parameters.

According to aspects, the outcome evaluator 110 may dynamically update the matchmaking engine 104 and the objective generation engine 106 based on the results of each match. Additionally, the player information 112 in the database 102 may be updated each time based on the results of the match. For example, if the match was not close, then the matchmaking engine 104 may be updated to provide a more challenging match for the winner and a less challenging match for the loser, assuming that each player would have had more fun if the game 108 were more evenly matched.

According to aspects, the outcome evaluator 110 may provide actionable reports for the creation and tuning of further administrator-driven archetypes and objective rules. As a long-term goal, the objective evaluator 110 will compare similar rules/objectives and dynamically generate its own objectives, flag emerging patterns in gameplay to the administrator for intervention either dynamically or via updated administrator rules.

In an implementation, the outcome evaluator 110 may provide a machine-learning algorithm with information to tune the matchmaking engine 104 and objective generation engine 106.

Figure 2:
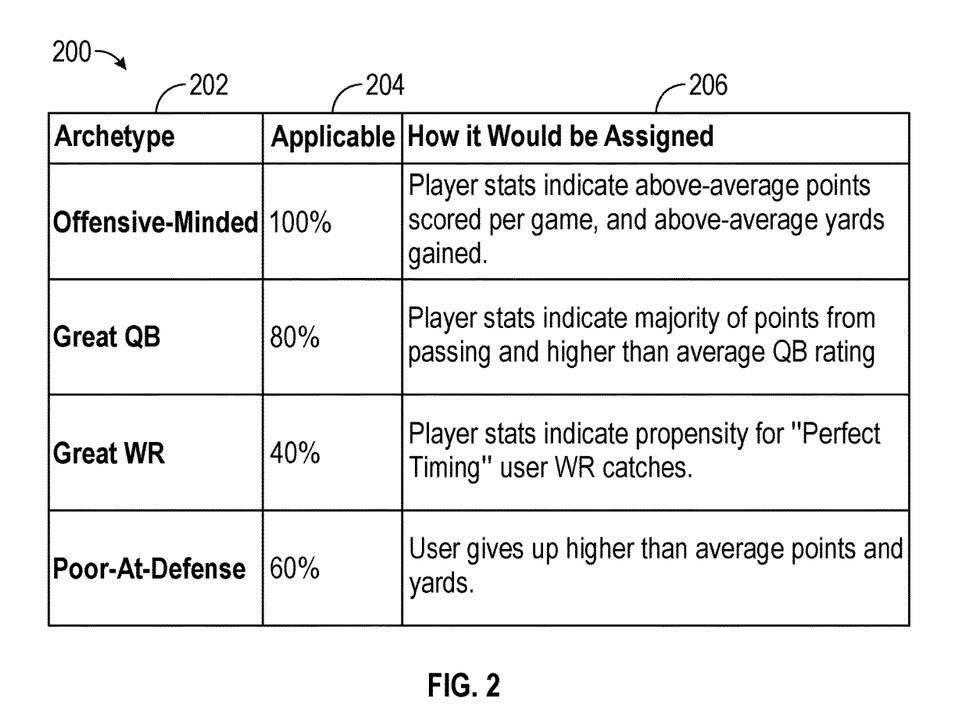
FIG. 2 illustrates exemplary player archetypes, according to certain aspects of the present disclosure.

FIG. 2 illustrates a chart 200 of exemplary player archetypes 202, according to certain aspects of the present disclosure. For example, in a football game, the player archetypes 202 may include "Offensive-Minded", "Great QB", "Great WR", "Poor-At-Defense." It is understood that various other player archetypes for various other games may be generated.

According to aspects, each player may have multiple archetypes 202, and each archetype 202 may include a weight 204. For example, the weight 204 may be assigned to each archetype 202 based on an assessment 206. In an implementation, the weight 204 may be determined based on assessing 206 the player information 112. For example, if the player is above average in points scored per game and above average in average yards gained 206, then the offensive statistics favor the archetype 202 for "Offensive-Minded" with a weight 204 of 100%. If the player has statistics that indicate a majority of points come from passing and a higher than average QB rating, then the player may be assigned the archetype 202 for "Great QB" with a weight 204 of 80%. Accordingly, the player may be assigned multiple archetypes 202, each with its own weight 204 based on an assessment 206.

In an implementation, each archetype 202 may include a premier scenario. For example, the "Offensive-Minded" archetype 202 may have a premier scenario that is against a "Defensive-Minded" archetype 202 (e.g., best offense vs. best defense).

According to aspects, an administrator may set rules that determine how much to weigh 204 each archetype 202. For example, a threshold may be met or exceeded to determine if the weight will be 100%. The threshold may be based on the player information 112, as described above. Similarly, other thresholds may be defined to determine other weights (e.g., below 100%). For example, the weight 204 may be an indicator of how likely a player has achieved dominance as a particular archetype 202. In an implementation, a machine-learning algorithm may be utilized to update the thresholds based on feedback from the outcome evaluator 110.

According to aspects, the archetypes 202 may be adjusted based on a desired player experience. For example, the archetypes 202 may be adjusted based on maximizing challenge, fun, being social, based on a certain type of game, etc.

Figure 3:
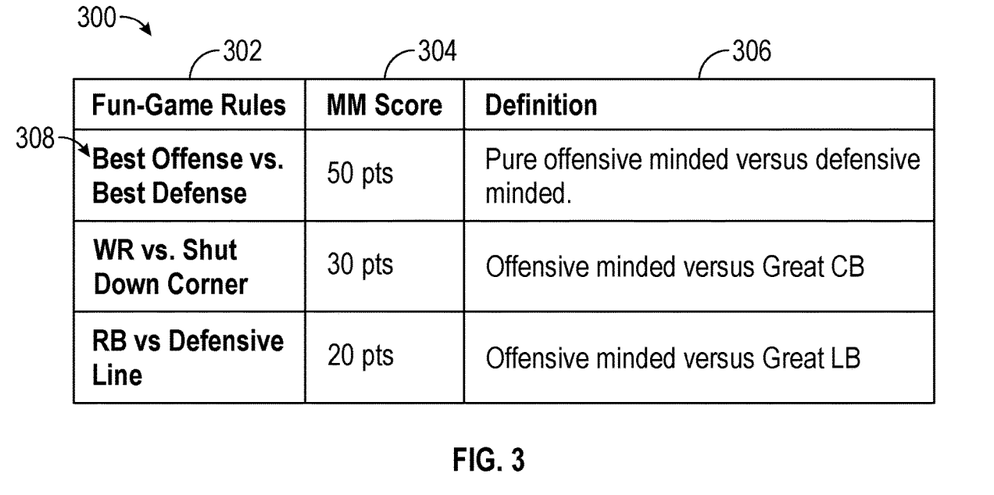
FIG. 3 illustrates exemplary scenarios, according to certain aspects of the present disclosure.

FIG. 3 illustrates a chart 300 of exemplary scenarios 302, according to certain aspects of the present disclosure. As described above, each of the archetypes 202 may include desired scenarios (e.g., offensive-minded vs. defensive-minded, great QB paired with great WR, teaming up poor-at-defense with great-at-defense), which may include a premier scenario 308. For example, the chart 300 may be for the "Offensive-Minded" archetype 202 of FIG. 2. The premier scenario 308 for the "Offensive-Minded" archetype 202 would be against a defensive minded player. Additional desired scenarios 302 include having a wide receiver (WR) against a shutdown cornerback (CB), and a running back (RB) against a strong defensive line.

As illustrated, each scenario 302 may include a score 304 based on how enjoyable each scenario 302 would be for that particular archetype 202. According to aspects, the score 304 may be determined based on administrator rules. Each scenario 302 may also include a definition 306. For example, each definition 306 may provide context for each scenario 302. The scenarios 302, definitions 306, and scores 304 may be updated based on results of each match. In an implementation, the premier scenario 308 may be the scenario 302 with the highest score 304.

According to aspects, the matchmaking engine 104 may calculate a matchmaking score based on a matchmaking algorithm in order to generate matches. For example, the scores 304 and archetype weights 204 may be utilized to calculate a matchmaking score that maximizes player enjoyment for a particular archetype 202.

According to an aspect, the matchmaking algorithm may be defined as:

$$\text{Archetype Weight} \times \text{Score} = \text{Matchmaking Score} \quad (1)$$

In an implementation, matchmaking scores may be calculated for each weight 204 and each score 304. A match would then be made when a defined matchmaking score is reached. A match may also be made based on a highest available matchmaking score, such as when a maximum acceptable matchmaking time has been reached.

According to aspects, both archetype weights 204 and scenario scores 304 may be exposed to machine learning to further optimize matches.

Figure 4:
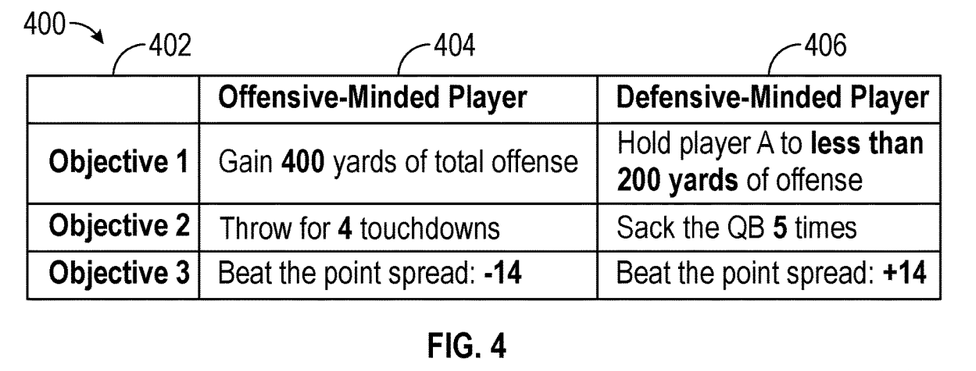
FIG. 4 illustrates exemplary in-game objectives, according to certain aspects of the present disclosure.

FIG. 4 illustrates a chart 400 of exemplary in-game objectives 402, according to certain aspects of the present disclosure. For example, once a match has been determined, the weighted parameters (e.g., archetype 202, weight 204, scenario 302, score 304) that made that match will be passed to the objective generation engine 106. The objective generation engine 106 will generate per-game, dynamic objectives 402 (e.g., keys to the match) based on a desired player experience (e.g., maximizing fun, player enjoyment, challenge, competition, etc.). For instance, for a match made to pair an "offensive-minded player" with a "defensive-minded player" players would see objectives such as those illustrated in FIG. 4.

Specifically, each of the players would receive multiple objectives 402 based on their archetypes 202. For example, the offensive-minded player would have offensive in-game objectives 404, such as gaining 400 yards of total offense, throwing for four touchdowns, and beating the point spread of −14. Similarly, the defensive-minded player would have defensive in-game objective 406, such as limiting the other player to less than 200 yards of offense, sacking the QB five times, and beating the point spread of +14.

The in-game objectives 402 add enjoyment to each player because they leverage the strengths of each player. This also would potentially lead to players finishing the match to completion in order to achieve each of the in-game objectives 402. In-game bonuses, rewards, and/or achievements may be unlocked upon accomplishing the in-game objectives 402.

According to aspects, the in-game objectives 402 may be optimized through machine-learning. For example, the type of objective (e.g., offensive, defensive, etc.), and internal goals of the objective (e.g., maintaining player involvement, maximizing player enjoyment, etc.) may be exposed to machine learning for further optimization of player experience. In an implementation, machine-learning may be utilized to analyze each match, including outcomes and parameters, to generate improved matches through more accurate archetypes, scenarios, and in-game objectives for each player.

Figure 5:
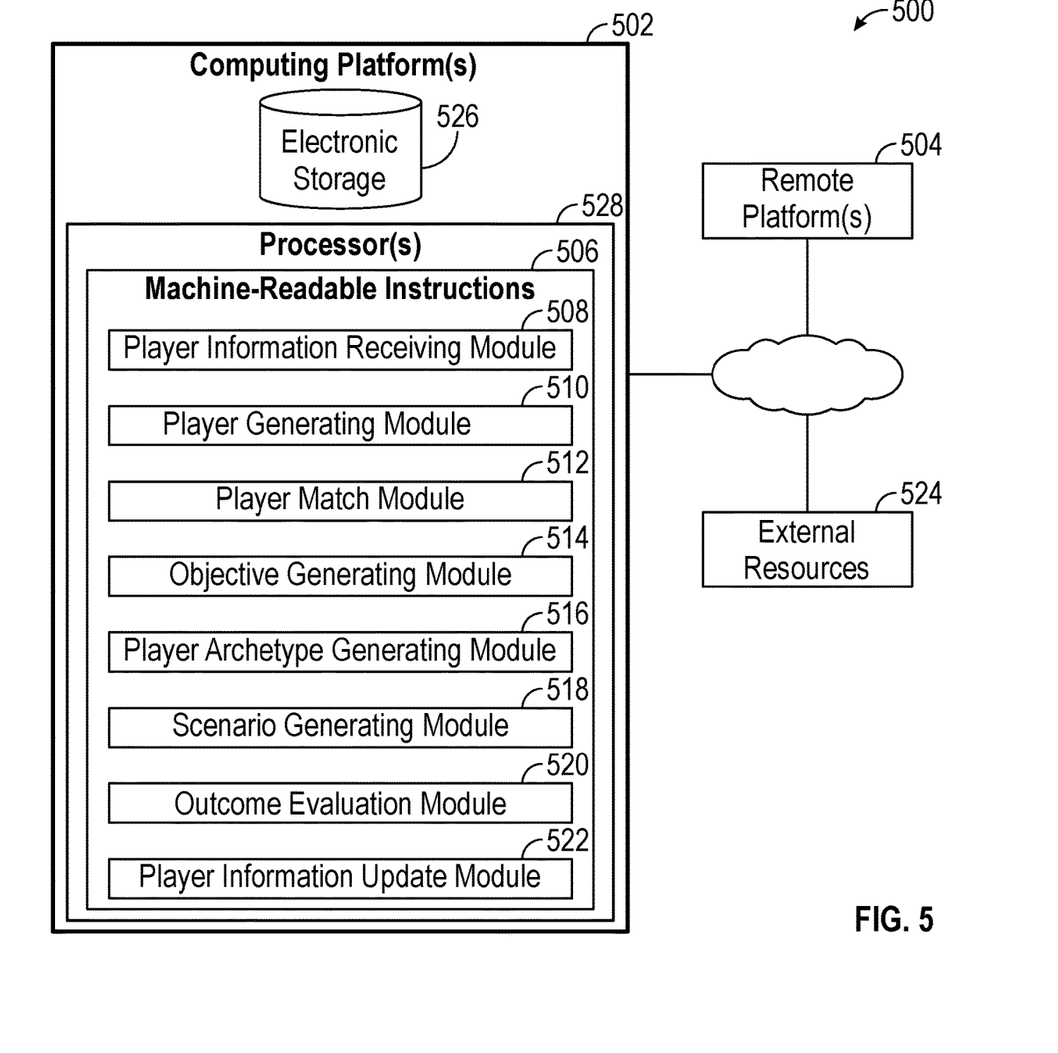
FIG. 5 illustrates a system configured for contextual matchmaking, in accordance with one or more implementations

FIG. 5 illustrates a system 500 configured for contextual matchmaking, in accordance with one or more implementations. In some implementations, system 500 may include one or more computing platforms 502. Computing platform(s) 502 may be configured to communicate with one or more remote platforms 504 according to a client/server architecture, a peer-to-peer architecture, and/or other architectures. Remote platform(s) 504 may be configured to communicate with other remote platforms via computing platform(s) 502 and/or according to a client/server architecture, a peer-to-peer architecture, and/or other architectures. Users may access system 500 via remote platform(s) 504.

Computing platform(s) 502 may be configured by machine-readable instructions 506. Machine-readable instructions 506 may include one or more instruction modules. The instruction modules may include computer program modules. The instruction modules may include one or more of player information receiving module 508, player generating module 510, player match module 512, objective generating module 514, player archetype generating module 516, scenario generating module 518, outcome evaluation module 520, player information update module 522, and/or other instruction modules.

Player information receiving module 508 may be configured to receive player information for a plurality of players. By way of non-limiting example, the player information for each player may include at least one of player statistics, player tendencies, and player preferences.

Player generating module 510 may be configured to generate player archetypes for each of the plurality of players based on the player information. Each of the player archetypes may include at least one premier scenario.

Player match module 512 may be configured to match the players based on the player archetypes.

Objective generating module 514 may be configured to generate in-game objectives based on the player archetypes. The in-game objectives may be generated based on player strengths.

Player archetype generating module 516 may be configured to generate a plurality of player archetypes for each of the plurality of players. The players may be matched based on results of a matching algorithm. Each of the plurality of player archetypes may include a weight. The player archetypes may be generated based on player strengths.

Scenario generating module 518 may be configured to generate a plurality of desired scenarios. Each of the plurality of desired scenarios may include a scenario score.

Outcome evaluation module 520 may be configured to evaluate an outcome of a match between the players.

Player information update module 522 may be configured to update the player information for each of the players based on the outcome of the match.

In some implementations, each player archetype may include an archetype weight and each premier scenario includes a scenario score.

In some implementations, computing platform(s) 502, remote platform(s) 504, and/or external resources 524 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 502, remote platform(s) 504, and/or external resources 524 may be operatively linked via some other communication media.

A given remote platform 504 may include one or more processors configured to execute computer program modules. The computer program modules may be configured to enable an expert or user associated with the given remote platform 504 to interface with system 500 and/or external resources 524, and/or provide other functionality attributed herein to remote platform(s) 504. By way of non-limiting example, a given remote platform 504 and/or a given computing platform 502 may include one or more of a server, a desktop computer, a laptop computer, a handheld computer, a tablet computing platform, a NetBook, a Smartphone, a gaming console, and/or other computing platforms.

External resources 524 may include sources of information outside of system 500, external entities participating with system 500, and/or other resources. In some implementations, some or all of the functionality attributed herein to external resources 524 may be provided by resources included in system 500.

Computing platform(s) 502 may include electronic storage 526, one or more processors 528, and/or other components. Computing platform(s) 502 may include communication lines, or ports to enable the exchange of information with a network and/or other computing platforms. Illustration of computing platform(s) 502 in FIG. 5 is not intended to be limiting. Computing platform(s) 502 may include a plurality of hardware, software, and/or firmware components operating together to provide the functionality attributed herein to computing platform(s) 502. For example, computing platform(s) 502 may be implemented by a cloud of computing platforms operating together as computing platform(s) 502.

Electronic storage 526 may comprise non-transitory storage media that electronically stores information. The electronic storage media of electronic storage 526 may include one or both of system storage that is provided integrally (i.e., substantially non-removable) with computing platform(s) 502 and/or removable storage that is removably connectable to computing platform(s) 502 via, for example, a port (e.g., a USB port, a firewire port, etc.) or a drive (e.g., a disk drive, etc.). Electronic storage 526 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 526 may include one or more virtual storage resources (e.g., cloud storage, a virtual private network, and/or other virtual storage resources). Electronic storage 526 may store software algorithms, information determined by processor(s) 528, information received from computing platform(s) 502, information received from remote platform(s) 504, and/or other information that enables computing platform(s) 502 to function as described herein.

Processor(s) 528 may be configured to provide information processing capabilities in computing platform(s) 502. As such, processor(s) 528 may include one or more of a digital processor, an analog processor, a digital circuit designed to process information, an analog circuit designed to process information, a state machine, and/or other mechanisms for electronically processing information. Although processor(s) 528 is shown in FIG. 5 as a single entity, this is for illustrative purposes only. In some implementations, processor(s) 528 may include a plurality of processing units. These processing units may be physically located within the same device, or processor(s) 528 may represent processing functionality of a plurality of devices operating in coordination. Processor(s) 528 may be configured to execute modules 508, 510, 512, 514, 516, 518, 520, and/or 522, and/or other modules. Processor(s) 528 may be configured to execute modules 508, 510, 512, 514, 516, 518, 520, and/or 522, and/or other modules by software; hardware; firmware; some combination of software, hardware, and/or firmware; and/or other mechanisms for configuring processing capabilities on processor(s) 528. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 508, 510, 512, 514, 516, 518, 520, and/or 522 are illustrated in FIG. 5 as being implemented within a single processing unit, in implementations in which processor(s) 528 includes multiple processing units, one or more of modules 508, 510, 512, 514, 516, 518, 520, and/or 522 may be implemented remotely from the other modules. The description of the functionality provided by the different modules 508, 510, 512, 514, 516, 518, 520, and/or 522 described below is for illustrative purposes, and is not intended to be limiting, as any of modules 508, 510, 512, 514, 516, 518, 520, and/or 522 may provide more or less functionality than is described. For example, one or more of modules 508, 510, 512, 514, 516, 518, 520, and/or 522 may be eliminated, and some or all of its functionality may be provided by other ones of modules 508, 510, 512, 514, 516, 518, 520, and/or 522. As another example, processor(s) 528 may be configured to execute one or more additional modules that may perform some or all of the functionality attributed below to one of modules 508, 510, 512, 514, 516, 518, 520, and/or 522.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 6:
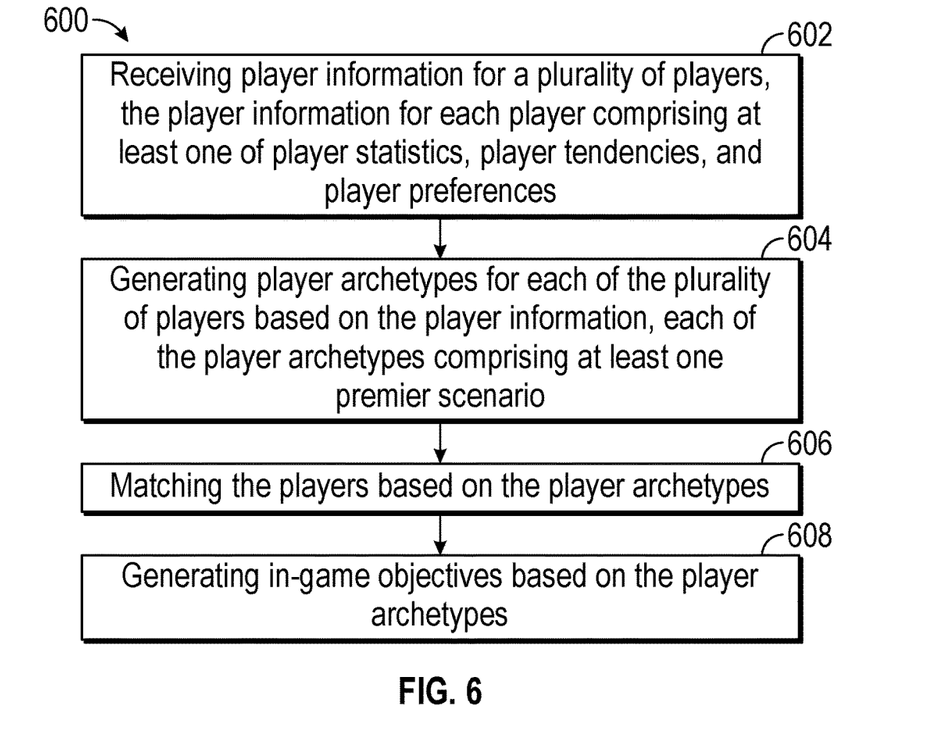
FIG. 6 illustrates an example flow diagram for contextual matchmaking, according to certain aspects of the disclosure.

FIG. 6 illustrates an example flow diagram (e.g., process 600) for contextual matchmaking, according to certain aspects of the disclosure. For explanatory purposes, the example process 600 is described herein with reference to FIGS. 1-4. Further for explanatory purposes, the steps of the example process 600 are described herein as occurring in serial, or linearly. However, multiple instances of the example process 600 may occur in parallel. For purposes of explanation of the subject technology, the process 600 will be discussed in reference to FIGS. 1-4.

At step 602, player information for multiple players is received. The player information for each player may include at least one of player statistics, player tendencies, and player preferences.

At step 604 player archetypes are generated for each of the multiple players based on the player information. Each of the player archetypes may include at least one premier scenario.

At step 606, the players are matched based on the player archetypes. At step 608, in-game objectives are generated based on the player archetypes.

For example, as described above in relation to FIGS. 1-4, at step 602, player information 112 for a plurality of players is received from a database 102. The player information 112 for each player may include at least one of player statistics, player tendencies, and player preferences. At step 604 player archetypes 202 are generated for each of the players based on the player information 112. Each of the player archetypes 202 may include at least one premier scenario 308. At step 606, the players are matched through the matchmaking engine 104 based on the player archetypes 202. At step 608, in-game objectives 402 are generated through the objective generation engine 106 based on the player archetypes 202.

According to an aspect, the player archetypes are generated based on player strengths. According to an aspect, players are matched based on results of a matching algorithm.

According to an aspect, each player archetype may include an archetype weight and each premier scenario may include a scenario score. According to an aspect, the in-game objectives are generated based on player strengths.

According to an aspect the process 600 may further include generating a plurality of player archetypes for each of the plurality of players, each of the plurality of player archetypes comprising a weight, and generating a plurality of desired scenarios, each of the plurality of desired scenarios comprising a scenario score.

According to an aspect the process 600 may further include evaluating an outcome of a match between the players, and updating the player information for each of the players based on the outcome of the match.

According to aspects, the in-game objectives may be optimized through machine-learning. For example, the type of objective (e.g., offensive, defensive, etc.), and internal goals of the objective (e.g., maintaining player involvement, maximizing player enjoyment, etc.) may be exposed to machine learning for further optimization of player experience. In an implementation, machine-learning may be utilized to analyze each match, including outcomes and parameters, to generate improved matches through more accurate archetypes, scenarios, and in-game objectives for each player.

Figure 7:
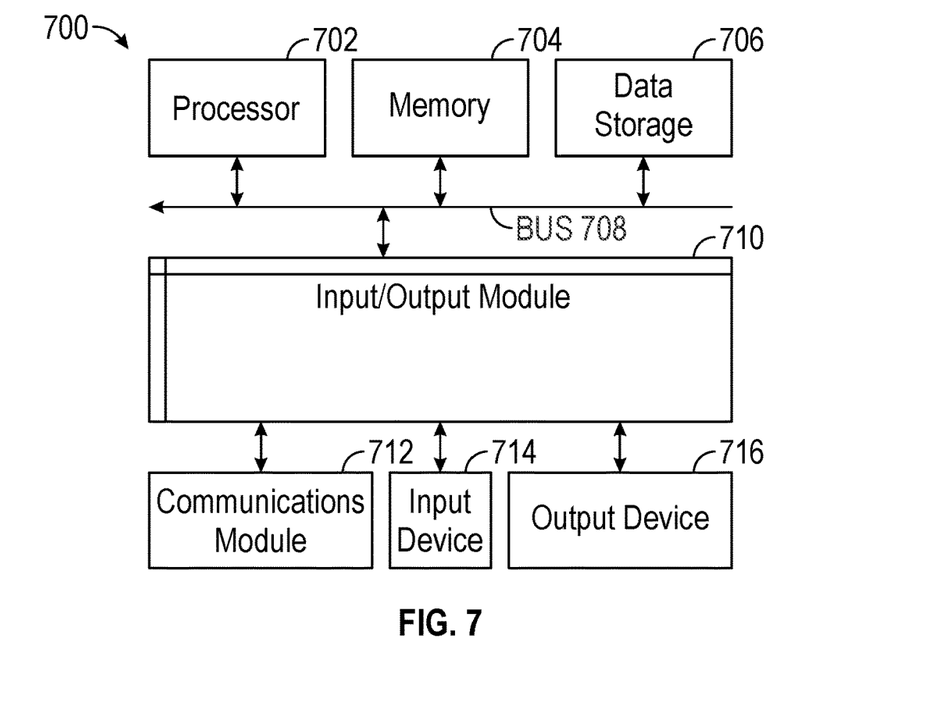
FIG. 7 is a block diagram illustrating an example computer system (e.g., representing both client and server) with which aspects of the subject technology can be implemented.

FIG. 7 is a block diagram illustrating an exemplary computer system 700 with which aspects of the subject technology can be implemented. In certain aspects, the computer system 700 may be implemented using hardware or a combination of software and hardware, either in a dedicated server, integrated into another entity, or distributed across multiple entities.

Computer system 700 (e.g., server and/or client) includes a bus 708 or other communication mechanism for communicating information, and a processor 702 coupled with bus 708 for processing information. By way of example, the computer system 700 may be implemented with one or more processors 702. Processor 702 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 700 can include, in addition to hardware, code that creates an execution environment for the computer program in question, e.g., code that constitutes processor firmware, a protocol stack, a database management system, an operating system, or a combination of one or more of them stored in an included memory 704, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 708 for storing information and instructions to be executed by processor 702. The processor 702 and the memory 704 can be supplemented by, or incorporated in, special purpose logic circuitry.

The instructions may be stored in the memory 704 and implemented in one or more computer program products, i.e., one or more modules of computer program instructions encoded on a computer readable medium for execution by, or to control the operation of, the computer system 700, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 704 may also be used for storing temporary variable or other intermediate information during execution of instructions to be executed by processor 702.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 700 further includes a data storage device 706 such as a magnetic disk or optical disk, coupled to bus 708 for storing information and instructions. Computer system 700 may be coupled via input/output module 710 to various devices. The input/output module 710 can be any input/output module. Exemplary input/output modules 710 include data ports such as USB ports. The input/output module 710 is configured to connect to a communications module 712. Exemplary communications modules 712 include networking interface cards, such as Ethernet cards and modems. In certain aspects, the input/output module 710 is configured to connect to a plurality of devices, such as an input device 714 and/or an output device 716. Exemplary input devices 714 include a keyboard and a pointing device, e.g., a mouse or a trackball, by which a user can provide input to the computer system 700. Other kinds of input devices 714 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 716 include display devices such as an LCD (liquid crystal display) monitor, for displaying information to the user.

According to one aspect of the present disclosure, the above-described gaming systems can be implemented using a computer system 700 in response to processor 702 executing one or more sequences of one or more instructions contained in memory 704. Such instructions may be read into memory 704 from another machine-readable medium, such as data storage device 706. Execution of the sequences of instructions contained in the main memory 704 causes processor 702 to perform the process steps described herein. One or more processors in a multi-processing arrangement may also be employed to execute the sequences of instructions contained in memory 704. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 700 can include clients and servers. A client and server are generally remote from each other and typically interact through a communication network. The relationship of client and server arises by virtue of computer programs running on the respective computers and having a client-server relationship to each other. Computer system 700 can be, for example, and without limitation, a desktop computer, laptop computer, or tablet computer. Computer system 700 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 702 for execution. Such a medium may take many forms, including, but not limited to, non-volatile media, volatile media, and transmission media. Non-volatile media include, for example, optical or magnetic disks, such as data storage device 706. Volatile media include dynamic memory, such as memory 704. Transmission media include coaxial cables, copper wire, and fiber optics, including the wires that comprise bus 708. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 700 reads game data and provides a game, information may be read from the game data and stored in a memory device, such as the memory 704. Additionally, data from the memory 704 servers accessed via a network the bus 708, or the data storage 706 may be read and loaded into the memory 704. Although data is described as being found in the memory 704, it will be understood that data does not have to be stored in the memory 704 and may be stored in other memory accessible to the processor 702 or distributed among several media, such as the data storage 706.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include", "have", or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration". Any embodiment described herein as "exemplary" is not necessarily to be construed as preferred or advantageous over other embodiments.

A reference to an element in the singular is not intended to mean "one and only one" unless specifically stated, but rather "one or more". All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for contextual matchmaking, comprising:
   receiving, for a plurality of players, player information generated during gameplay comprising a plurality of prior game sessions, the player information for each player comprising at least one of player statistics, player tendencies, or player preferences;
   generating player archetypes and thresholds for each of the plurality of players based on the player information, wherein at least one of the player archetypes comprises an optimal archetype having an optimal weight, the optimal weight is determined when the corresponding threshold is met or exceeded;
   generating customized in-game objectives for each of the players based on the player archetypes of each of the players;
   pairing the players based on the player archetypes and a weighted matchmaking score, the weighted matchmaking score comprising a product of the optimal weight and a premier scenario score for each player, the premier scenario score comprising a highest scenario score of a plurality of match scenarios;

identifying actionable data configured for creating or tuning of the player archetypes based at least in part on an outcome of a match between the players and whether the players achieved their customized in-game objectives during the match;

identifying emerging patterns in gameplay based on the actionable data; and updating the player archetypes based on the emerging patterns of the actionable data.

2. The computer-implemented method of claim 1, wherein the player archetypes are generated based on player strengths.

3. The computer-implemented method of claim 1, wherein the players are matched based on results of a matching algorithm.

4. The computer-implemented method of claim 1, wherein each player archetype comprises an archetype weight and each premier scenario comprises a scenario score.

5. The computer-implemented method of claim 1, further comprising:
   generating a plurality of player archetypes for each of the plurality of players, each of the plurality of player archetypes comprising a weight; and
   generating a plurality of desired scenarios, each of the plurality of desired scenarios comprising a scenario score.

6. The computer-implemented method of claim 1, wherein the in-game objectives are generated based on player strengths.

7. The computer-implemented method of claim 1, further comprising:
   evaluating the outcome of the match between the players; and
   updating the player information for each of the players based on the outcome of the match.

8. A system for contextual matchmaking, comprising:
   a processor; and
   a memory comprising instructions stored thereon, which when executed by the processor, causes the processor to perform:
   receiving, for a plurality of players, player information generated during gameplay comprising a plurality of prior game sessions, the player information for each player comprising at least one of player statistics, player tendencies, or player preferences;
   generating player archetypes and thresholds for each of the plurality of players based on the player information, wherein at least one of the player archetypes comprises an optimal archetype having an optimal weight, the optimal weight is determined when the corresponding threshold is met or exceeded;
   generating customized in-game objectives for each of the players based on the player archetypes of each of the players;
   pairing the players based on the player archetypes and a weighted matchmaking score, the weighted matchmaking score comprising a product of the optimal weight and a premier scenario score for each player, the premier scenario score comprising a highest scenario score of a plurality of match scenarios;
   identifying actionable data configured for creating or tuning of the player archetypes based at least in part on an outcome of a match between the players and whether the players achieved their customized in-game objectives during the match;
   identifying emerging patterns in gameplay based on the actionable data; and
   updating the player archetypes based on the emerging patterns of the actionable data.

9. The system of claim 8, wherein the player archetypes are generated based on player strengths.

10. The system of claim 8, wherein the players are matched based on results of a matching algorithm.

11. The system of claim 8, wherein each player archetype comprises an archetype weight and each premier scenario comprises a scenario score.

12. The system of claim 8, further comprising stored sequences of instructions, which when executed by the processor, cause the processor to perform:
   generating a plurality of player archetypes for each of the plurality of players, each of the plurality of player archetypes comprising a weight; and
   generating a plurality of desired scenarios, each of the plurality of desired scenarios comprising a scenario score.

13. The system of claim 8, wherein the in-game objectives are generated based on player strengths.

14. The system of claim 8, further comprising stored sequences of instructions, which when executed by the processor, cause the processor to perform:
   evaluating the outcome of the match between the players; and
   updating the player information for each of the players based on the outcome of the match.

15. A non-transitory computer-readable storage medium comprising instructions stored thereon, which when executed by one or more processors, cause the one or more processors to perform operations for contextual matchmaking, the operations comprising:
   receiving, for a plurality of players, player information generated during gameplay comprising a plurality of prior game sessions, the player information for each player comprising at least one of player statistics, player tendencies, or player preferences;
   generating player archetypes and thresholds for each of the plurality of players based on the player information, wherein at least one of the player archetypes comprises an optimal archetype having an optimal weight, the optimal weight is determined when the corresponding threshold is met or exceeded;
   generating customized in-game objectives for each of the players based on the player archetypes of each of the players;
   pairing the players based on the player archetypes and a weighted matchmaking score, the weighted matchmaking score comprising a product of the optimal weight and a premier scenario score for each player, the premier scenario score comprising a highest scenario score of a plurality of match scenarios;
   identifying actionable data configured for creating or tuning of the player archetypes based at least in part on an outcome of a match between the players and whether the players achieved their customized in-game objectives during the match;
   identifying emerging patterns in gameplay based on the actionable data; and
updating the player archetypes based on the emerging patterns of the actionable data.

16. The computer-readable storage medium of claim 15, wherein the player archetypes are generated based on player strengths.

17. The computer-readable storage medium of claim 15, wherein the players are matched based on results of a matching algorithm.

18. The computer-readable storage medium of claim 15, wherein each player archetype comprises an archetype weight and each premier scenario comprises a scenario score.

19. The computer-readable storage medium of claim 15, comprising further instructions which, when executed by the one or more processors, cause the one or more processors to perform operations comprising:
- generating a plurality of player archetypes for each of the plurality of players, each of the plurality of player archetypes comprising a weight; and
- generating a plurality of desired scenarios, each of the plurality of desired scenarios comprising a scenario score.

20. The computer-readable storage medium of claim 15, wherein the in-game objectives are generated based on player strengths.

\* \* \* \* \*